United States Patent
Gradu

(10) Patent No.: US 6,755,762 B2
(45) Date of Patent: *Jun. 29, 2004

(54) AXLE CENTER WITH ACTIVE TORQUE BIAS CONTROL

(75) Inventor: Mircea Gradu, Wooster, OH (US)

(73) Assignee: The Timken Company, Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/107,023

(22) Filed: Mar. 25, 2002

(65) Prior Publication Data

US 2003/0181278 A1 Sep. 25, 2003

(51) Int. Cl.[7] ............................................. F16H 48/30
(52) U.S. Cl. ....................................... 475/150; 475/248
(58) Field of Search ................................ 475/204, 248, 475/249, 150, 293; 192/3.52, 48.2

(56) References Cited

U.S. PATENT DOCUMENTS

| | | | | |
|---|---|---|---|---|
| 2,709,928 A | * | 6/1955 | Jones | 475/154 |
| 3,370,486 A | * | 2/1968 | Lamburn | 475/204 |
| 4,417,641 A | | 11/1983 | Kageyama | |
| 4,606,446 A | | 8/1986 | Watanabe | |
| 4,677,875 A | * | 7/1987 | Batchelor | 475/249 |
| 4,803,628 A | | 2/1989 | Hayashi et al. | |
| 4,866,624 A | | 9/1989 | Nishikawa et al. | |
| 4,871,049 A | | 10/1989 | Okita | |
| 5,135,071 A | * | 8/1992 | Shibahata et al. | 475/249 |
| 5,226,860 A | * | 7/1993 | Baxter et al. | 475/248 |
| 5,396,421 A | * | 3/1995 | Niikura et al. | 475/150 |
| 5,409,428 A | | 4/1995 | Antonov | |
| 5,525,116 A | | 6/1996 | Ra et al. | |
| 5,733,222 A | | 3/1998 | Kawahara et al. | |
| 5,845,546 A | * | 12/1998 | Knowles et al. | 74/650 |
| 5,904,634 A | * | 5/1999 | Teraoka | 475/204 |
| 5,910,064 A | * | 6/1999 | Kuroki | 475/205 |
| 5,979,631 A | | 11/1999 | Lundström | |
| 5,980,415 A | | 11/1999 | Showalter | |
| 6,098,770 A | | 8/2000 | Isley, Jr. | |
| 6,327,935 B1 | | 12/2001 | Joslin et al. | |

FOREIGN PATENT DOCUMENTS

| | | |
|---|---|---|
| DE | 3533142 A1 | 10/1986 |
| DE | 19527484 A1 | 8/1996 |
| DE | 19815881 A1 | 10/1999 |

OTHER PUBLICATIONS

U.S. patent application Ser. No. 10/006,312, Gradu, filed Dec. 6, 2001.
U.S. patent application Ser. No. 10/059,450, Gradu, filed Jan. 29, 2002.

* cited by examiner

*Primary Examiner*—Charles A Marmor
*Assistant Examiner*—Dennis Abdelnour
(74) *Attorney, Agent, or Firm*—Polster, Lieder, Woodruff, Lucchesi, L.C.

(57) ABSTRACT

An axle center for delivering engine torque to two axle shafts which in turn transfer the torque to road wheels includes a torque coupling though which the torque is transferred to the axle shafts. The coupling includes a magnetic particle clutch and a planetary set organized about a common axis and coupled together such that two paths—a mechanical path and a clutch path—exist in the coupling for transferring torque through it, with the amount of torque transferred being dependent solely on the current in the magnetic particle clutch. A single torque coupling may be located where torque is delivered to the axle center or two torque couplings may be located at and connected to the two axle shafts, one for each shaft.

13 Claims, 5 Drawing Sheets

AXLE CENTER WITH ACTIVE TORQUE BIAS CONTROL

CROSS-REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

This invention relates in general to axle centers for automotive vehicles and more particularly to axle centers which have the capacity to vary and control the torque transmitted through them.

Automotive vehicles have their road wheels arranged on so-called "axles", with the wheels of any axle being generally aligned across the vehicle. When the wheels of an axle drive the vehicle, they are coupled to individual axle shafts which are, in turn, coupled to the transmission of the vehicle through an axle center. Normally the axle center contains a differential which delivers torque to both wheels of the axle, but allows one wheel to rotate at a different velocity than the other, so that the vehicle can negotiate turns. But the typical differential does not provide any control over the distribution of torque between the wheels of the axle.

In all-wheel drive vehicles a similar problem exists. In such a vehicle the wheels of the front axle and the wheels of the rear axle have torque delivered to them, often with little control over how the torque is distributed between the two axles. To be sure, more sophisticated vehicles have clutches for controlling the distribution of torque between the front and rear axles, but these clutches are complex, relatively large and heavy, and furthermore require complex controls.

SUMMARY OF THE INVENTION

The present invention resides in an axle center that includes a torque coupling through which the torque for driving wheels passes. The coupling contains a planetary set and a clutch coupled together so that torque transfers through the coupling in two paths—a mechanical path and a clutch path. The axle center may have a single coupling connected to its pinion shaft or two couplings, one at each location where torque is delivered from the axle center to the wheels through axle shafts.

DETAILED DESCRIPTION OF THE INVENTION

Figure 1:
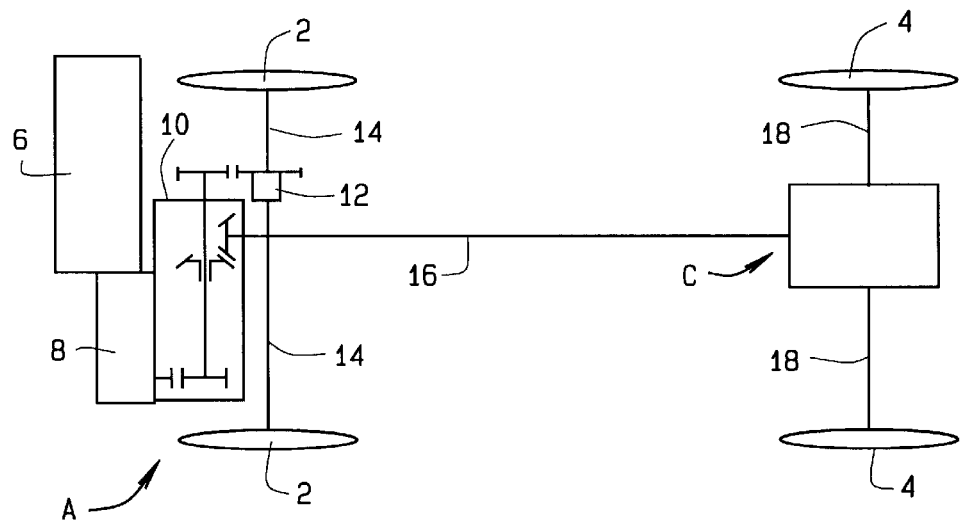
FIG. 1 is a schematic view of an automotive vehicle provided with an axle center constructed in accordance with and embodying the present invention.

Referring now to the drawings, an automotive vehicle A (FIG. 1) includes a set of primary wheels 2 at the front of the vehicle and another set of secondary wheels 4 at the rear of the vehicle. It also has a motor 6 which delivers the torque that it develops through a transmission 8 which has the capacity to modify that torque. The transmission 8 delivers the torque through a transfer case or power take-off unit (PTO) 10 to both sets of wheels 2 and 4.

The transfer case or PTO 10 in effect splits the torque from the transmission 8. That portion of the torque that is delivered to the primary wheels 2 passes through a differential 12 and thence to the wheels 2 through axle shafts 14. That which is delivered to the secondary wheels 4 passes through a drive shaft 16 to an axle center C and thence to the wheels 4 through axle shafts 18. The axle center C controls the distribution of torque between the wheels 2 and the wheels 4, and indeed has the capacity to vary the torque between the wheels 2 and the wheels 4.

Figure 2:
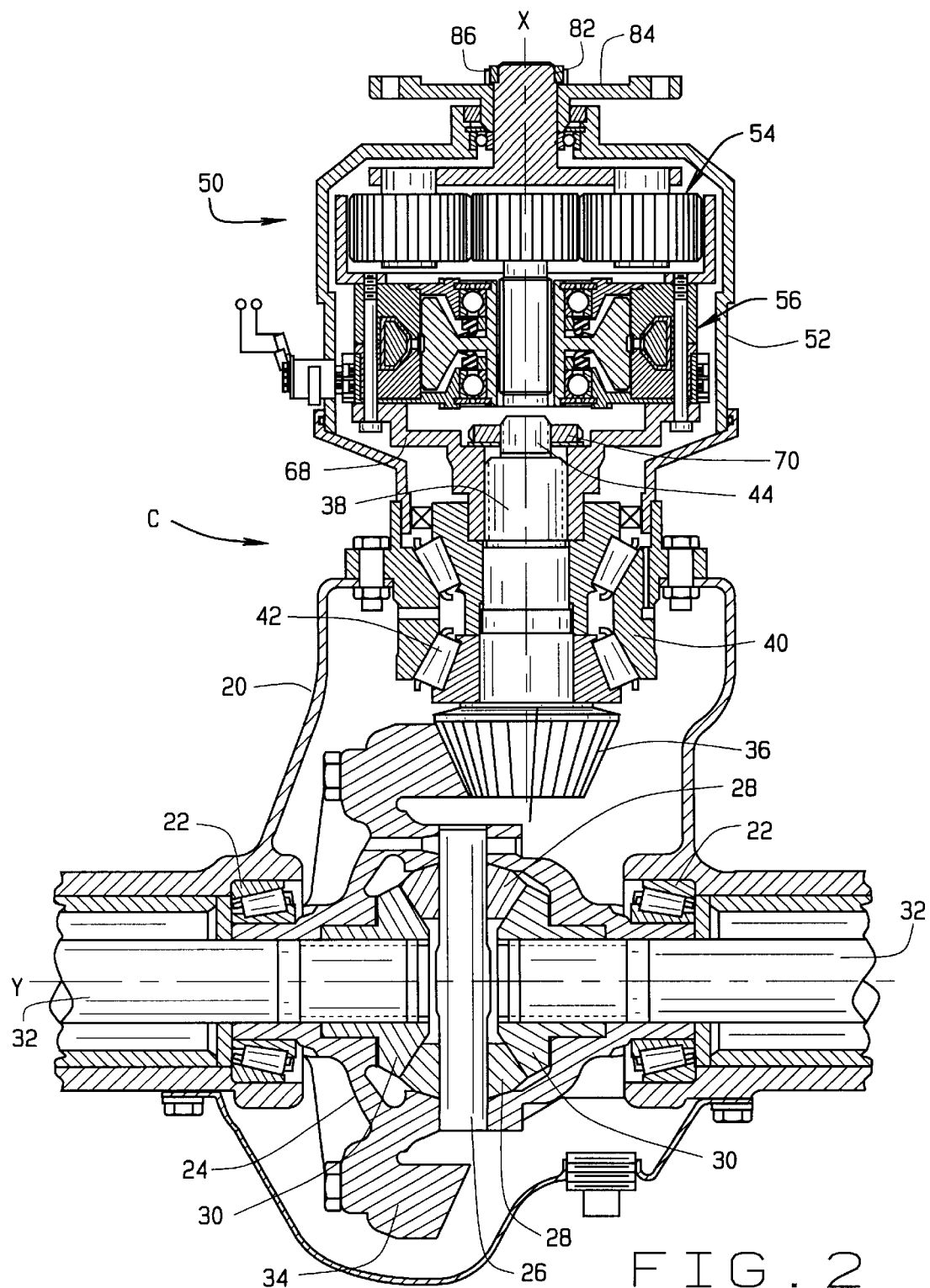
FIG. 2 is a sectional view of an axle center constructed in accordance with the present invention.

The axle center C includes (FIG. 2) a housing 20 which contains a pair of antifriction bearings 22 in which a differential carrier 24 revolves about an axis Y. The carrier 24 supports a cross shaft 26 on which bevel gears 28 rotate. The bevel gears 28 engage more bevel gears 30 that have the capacity to rotate in the carrier 24 itself independently of each other, and the gears 30 are connected to output shafts 32 which extend from the housing 20. The output shafts 32 may be connected to the axle shafts 18 through constant velocity (CV) joints or they may be the ends of the axle shafts 18 themselves. The carrier 24 has a ring gear 34, attached to it and the ring gear 34 meshes with a pinion 36 that is located on one end of a pinion shaft 38. The pinion shaft 38 rotates in a pinion carrier 40 that contains an antifriction bearing 42, and at its other end has a spline which lies beyond the bearing 42 and threads 44 located beyond the spline.

The housing 20 and the pinion carrier 40 together with their contents constitute nothing more then a traditional automotive differential. Indeed, the carrier 24, the cross shaft 26, the bevel gears 28 and 30, and the ring gear 64 constitute a typical differential cluster.

Figure 3:
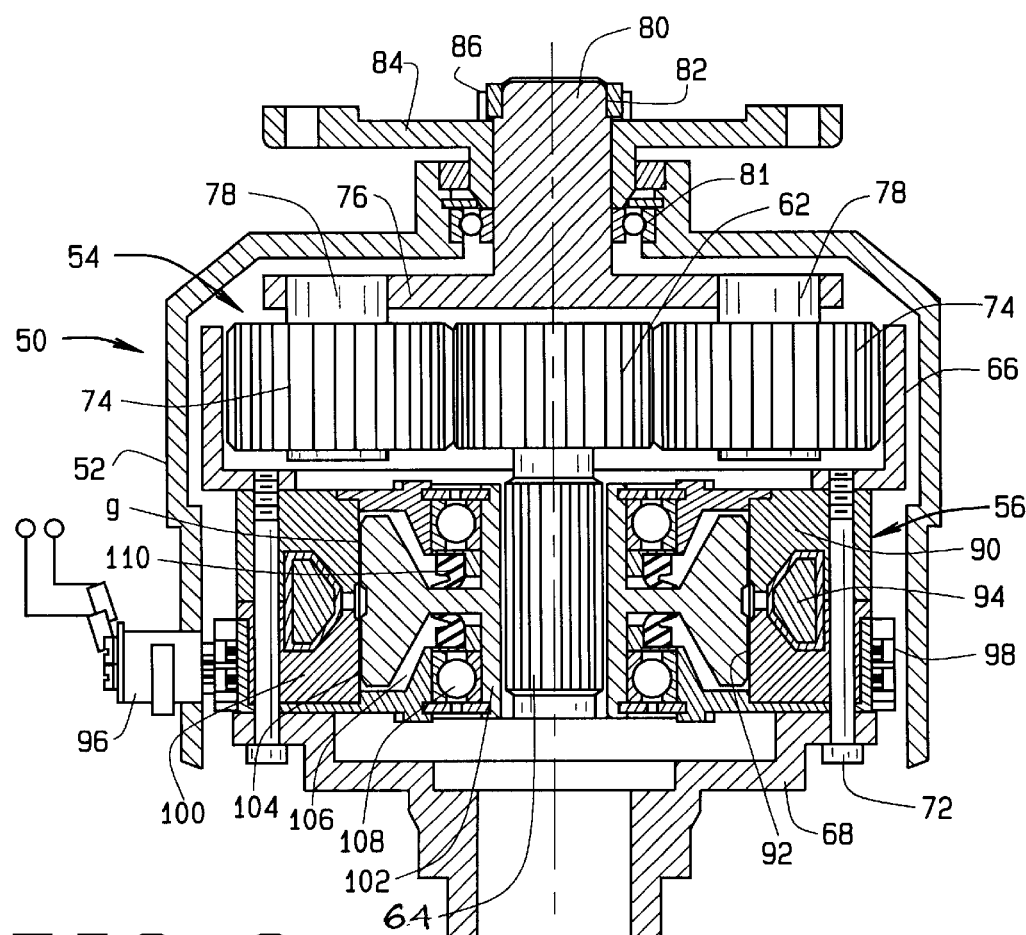
FIG. 3 is an enlarged sectional view of a torque coupling forming part of the axle center of FIG. 2.

But the axle center C includes more—specifically, a torque bias coupling 50 which modulates the torque transferred to the secondary wheels 4 and thereby also apportions the torque between the primary wheels 2 and the secondary wheels 4. The coupling 50 includes (FIG. 3) a housing 52 which is secured firmly to the pinion carrier 40 and differential housing 20. It also includes a planetary gear set 54 and a magnetic particle clutch 56 located within the housing 52 where they are organized about an axis X which coincides with the axis of rotation for the pinion shaft 38 and is located at an angle with respect to the axis Y. The coupling 50 provides two torque transfer paths between the drive shaft 16 and the pinion shaft 38—one a purely mechanical path that passes through the planetary gear set 54 and the other a clutch path which passes through both the clutch 56 and the planetary gear set 54. Most of the torque passes through the mechanical path, so it is the high torque path. The clutch path serves as the low torque path.

The planetary gear set 54 includes (FIG. 3) a sun gear 62 having a stub shaft 64 extended from it into the clutch 56.

It also includes a ring gear 66 located around the sun gear 62. The ring gear 66 is coupled to the pinion shaft 38 through an end flange 68 which is located beyond the clutch 56. To this end, the end flange 68 and pinion shaft 38 are engaged through mating splines and secured one to the other by a nut 70 (FIG. 2) which is turned down over the threads 44 on the end of the pinion shaft 38. The end flange 68 and ring gear 66 are in turn connected by machine screws 72 which extend from the end flange 68 through the clutch 56 and thread into the end of the ring gear 66 which is turned inwardly at its one end to receive the screws 72. In addition, the planetary set 54 has planet gears 74 which are located between the sun gear 62 and ring gear 66 and engage both. Finally, the planetary set has a carrier 76 provided with spindles 78 on which the planet gears 74 rotate. In addition, the carrier 76 has a stub shaft 80 which rotates on an antifriction bearing 81 that is fitted to the housing 52. The shaft 80 projects out of the housing 52 toward the transmission 8, and at its end is provided with threads 82.

The stub shaft 80 is coupled with another end flange 84 through mating splines, with the flange 84 being secured to the shaft 80 with a nut 86 that is turned down over the threads 82. The end flange 84 constitutes a torque input member and the end flange 68 constitutes a torque output member.

The magnetic particle clutch 56 includes (FIG. 3) an electromagnet 90 which is captured between the end flange 68 on the pinion shaft 38 and the ring gear 66 of the planetary gear set 54 and is secured to both with the machine screws 72. As a consequence, the pinion shaft 38, the end flange 68, the ring gear 66, and the electromagnet 90 all rotate as a unit about the axis X. The electromagnet 90 has a cylindrical surface 92 that is presented inwardly toward the axis X and further contains a coil 94 to which electrical current is supplied through a set of brushes 96 that are on the housing 52 and a set of slip rings 98 which rotate with the electromagnet 90.

In addition to the electromagnet 90 and its coil 94, the clutch 56 has (FIG. 3) an armature 100 which is located within the electromagnet 90 and includes a sleeve 102 that fits over the stub shaft 64 on the sun gear 62 of the planetary gear set 56, it being coupled to the stub shaft 64 through mating splines. The armature 100 also has a cylindrical surface 104 which is presented outwardly away from the axis X and toward cylindrical surface 92 on the electromagnet 90, there being a small gap g between the cylindrical surfaces between 92 and 104. Opening out of the ends of the armature 70 are annular recesses 106 which contain antifriction bearings 108 that support the electromagnet 90 on the armature 100.

The bearings 108 fit around the sleeve 102 of the armature 100 and the electromagnet 90 in turn fits around the bearing 108. The arrangement is such that the ring gear 66, the electromagnet 90, the end flange 68, and pinion shaft 38 rotate as a singe unit about the axis X, and likewise sun gear 42 and its stub shaft 64, and the armature 100 rotate as another unit about the axis X. Normally the two units rotate at slightly different angular velocities. When the clutch 56 engages, the stub shaft 64 and sun gear 62 provide the required reaction torque to make the two units rotate together.

Figure 4:
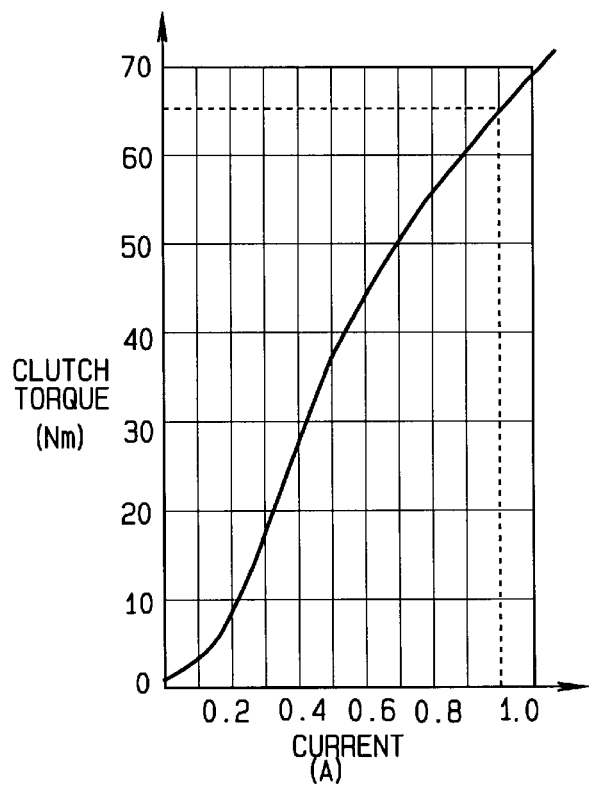
FIG. 4 is a graph showing the relationship between torque transferred through the clutch of the torque coupling and the current in the clutch.

The clutch 56 contains fine particles of a ferrous substance that can be magnetized, and they exist in the gap g. The bearings 108 are isolated from the magnetic particles by seals 110. When the coil 94 is energized with electrical current, the particles become magnetized and connect the electromagnet 90 with the armature 100 such that torque can be transferred between the two, yet slippage between the two can occur as well. The amount of torque transferred depends solely on the amount of current conducted by the coil 94, and is totally independent of the magnitude of the slippage or the temperature. Indeed, the relationship between torque and current, when plotted on Cartesian coordinates, closely approaches being linear (FIG. 4).

The amount of current directed through the coil 94 of the electromagnet 90 may be controlled by a manually operated device such as a rheostat. It may also be controlled by a microprocessor which derives signals from sensors that monitor various driving conditions, such as speed, throttle position, forward and lateral accelerations, and steering wheel position, with the microprocessor directing current of a magnitude that enables the vehicle A to operate best under the conditions monitored.

In the operation of the vehicle A, the torque generated by the motor 6 is transferred throughout the transmission 8, which may alter it, to the transfer case or PTO 10, which splits it, delivering a portion to the primary wheels 2 and the remainder to the secondary wheels 4. Actually, the torque is delivered to the primary wheels 2 without any slippage, it passing from transfer case or PTO 10 to the differential 12 and thence to the wheels 2 through the axle shafts 14. The torque which is delivered to the secondary wheels 4 passes from the transfer case or PTO 10 through the drive shaft 16 and thence through the axle center C to the axle shafts 14 which deliver it to the wheels 4. The torque delivered to the primary wheels 2 together with the torque delivered to the secondary wheels 4 equals the total torque in the system, less of course any system losses, such as the torque lost through friction. That total torque is apportioned between the primary wheels 2 and the secondary wheels 4 by the torque coupling 50 of the axle center C, with the apportionment being dependent on the amount of current passing through the coil 94 in the clutch 56 of the coupling 50. The greater the current, the higher the proportion of torque transferred to the secondary wheels 4.

Considering the operation of the coupling 50, the drive shaft 16 delivers torque to the coupling 50 at its input end flange 84. Within the coupling 50, the torque splits into two paths and then recombines so that the torque in the output end flange 68 and in the pinion shaft 38 essentially equals the torque at the input end flange 84. In the one path—the mechanical path—the torque passes from the end flange 84 to the carrier 76, from which it is transferred at the spindles 78 to the planet gears 74 which in turn transfer it to the ring gear 66. The torque passes from the ring gear 66 to the output end flange 68 and thence to the pinion shaft 38 and pinion 36. In the other path—the clutch path—the torque passes from the input end flange 84 likewise into planet gears 74 at the spindles 78 of the carrier 76. The planet gears 74 transfer the torque to the sun gear 62 which through its stub shaft 64 transfers the torque to the armature 100 of the clutch 56. The torque within the clutch path passes through the magnetic particles in the gap g between the armature 100 and electromagnet 90 and then passes to the output end flange 68 where it combines with the torque in the mechanical path. The sun gear 62 represents the low torque element of the planetary set 54, and the clutch path utilizes the sun gear 62. Thus, the mechanical path transfers most of the torque.

The division of torque between the two paths depends on the gear ratio U between the ring gear 66 and the sun gear 62:

$$U = \text{teeth on ring gear 66/teeth or sun gear 62}$$

Figure 5:
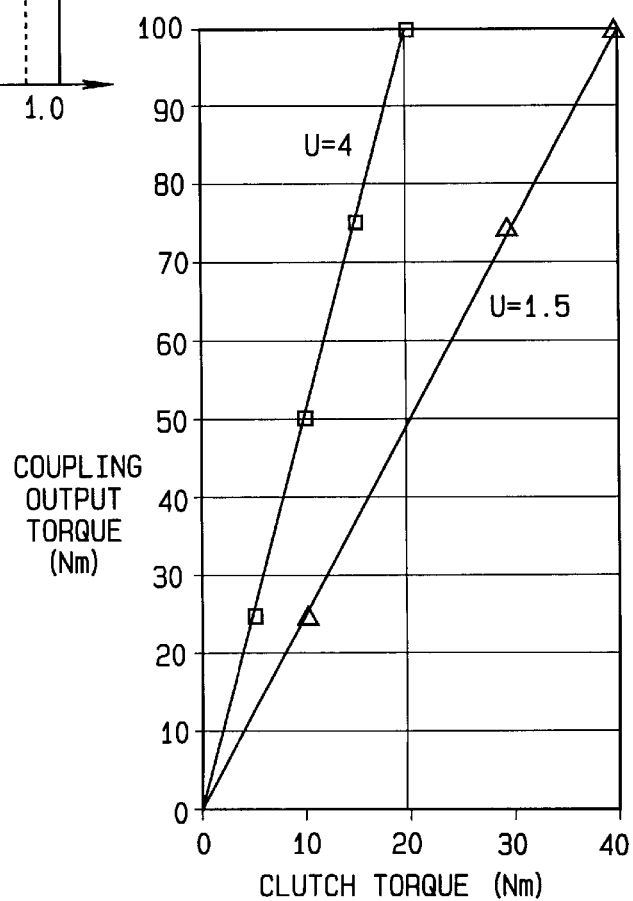
FIG. 5 is a graph showing the relationship between torque transferred through the coupling of the axle center and the torque transferred through the clutch of the coupling.

The higher the ratio U, the less the amount of torque transferred through the clutch path and conversely the more torque transferred through the mechanical path. The relationship may be demonstrated with a plot on Cartesian coordinates of the output torque for the coupling 50, that is the torque in the end flange 68—and likewise end flange 84—against the torque in the clutch 56 (FIG. 5).

Referring to the two plots (FIGS. 4 & 5), a reduction of the current in the coil 94 of the clutch 56 will reduce the torque transmitted through the clutch path, and that in turn will reduce the total torque delivered through the output end flange 68 to the pinion 36. Accordingly, a lesser amount of torque is diverted from the transfer case or PTO 10 to be transferred to the secondary wheels 4 and of course a greater amount of torque is transferred to the primarily driving wheels 2. Conversely, when the current in the coil 94 of the clutch 56 increases, the clutch 56 transfers more torque which translates in more torque in the clutch path and a proportionally greater torque at the output end flange 68 and pinion 36—and at the input end flange 84 as well. The greater demand for torque by the input end flange 84 leaves less torque for the primary drive wheels 2. Thus, the amount of current passing through the coil 94 of the magnetic particle clutch 56 determines the proportion of the total torque which is diverted through the torque coupling 50 and that of course reflects the torque delivered to the secondary wheels 4. The remaining torque from the transfer case 10 goes to the primary wheels 2. In short, the current in the coil 94 of the magnetic particle clutch 56 controls the division of torque between primary wheels 2 and the secondary wheels 4, and that current is the only main control parameter for the clutch 56, this being in contrast with conventional plate-type clutches in which the pressure applied to the plates, the amount of slippage in the clutch and other variables, such as temperature, control the amount of torque transferred through such clutches. Moreover, the relationship between torque and current is nearly linear which affords good control.

The clutch 56 sees some slippage under typical driving conditions, with the input end flange 84 rotating slightly faster than the output end flange 68, but the difference in angular velocities is not substantial and produces only a very small dissipation of power. Of course, when the slippage is low, the sungear 62 and ring gear 66 of the planetary set 54 as well as the carrier 76 all rotate essentially at the same velocity—indeed, nearly as a unit.

Figure 6:
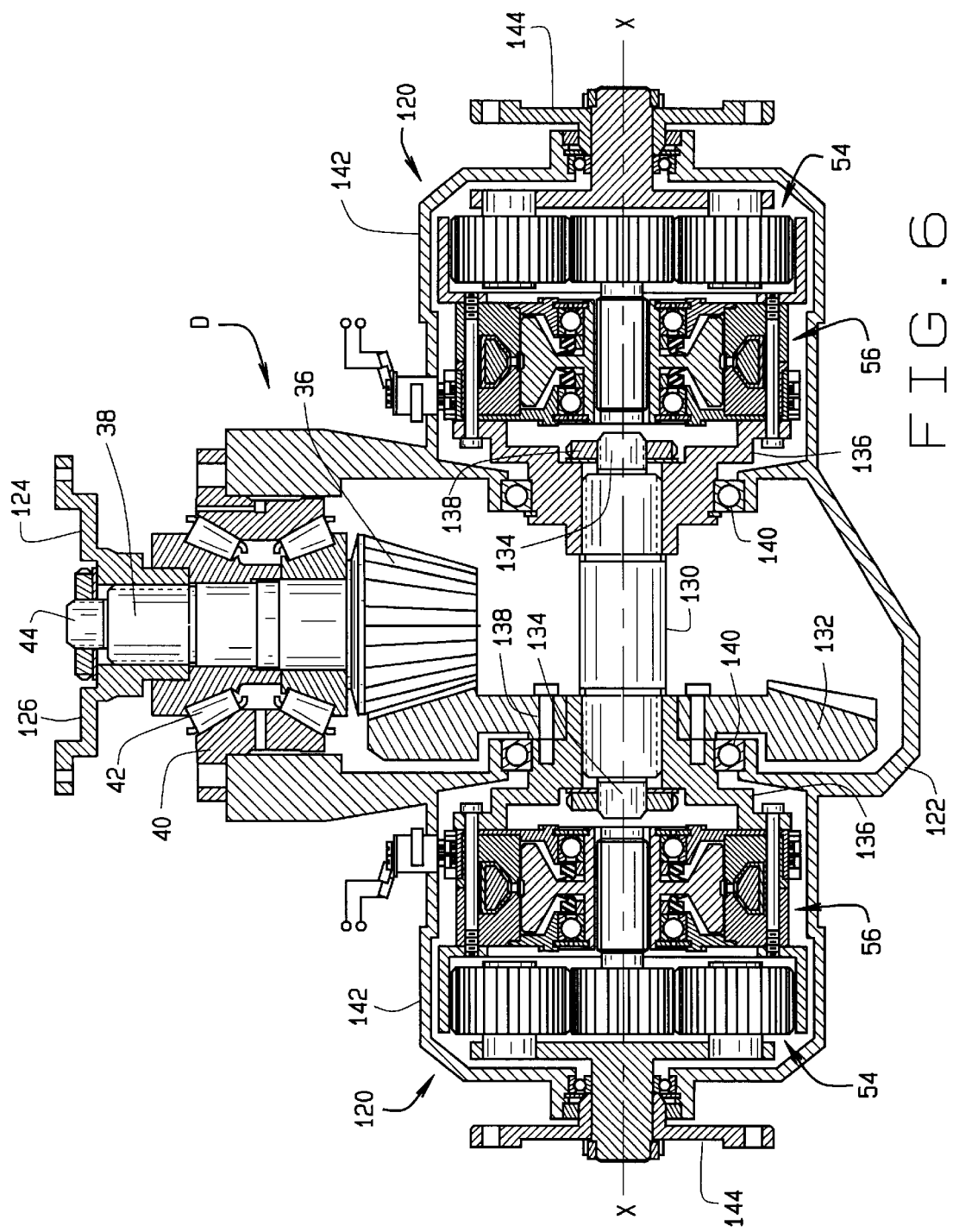
FIG. 6 is a sectional view of a modified axle center.
Figure 7:
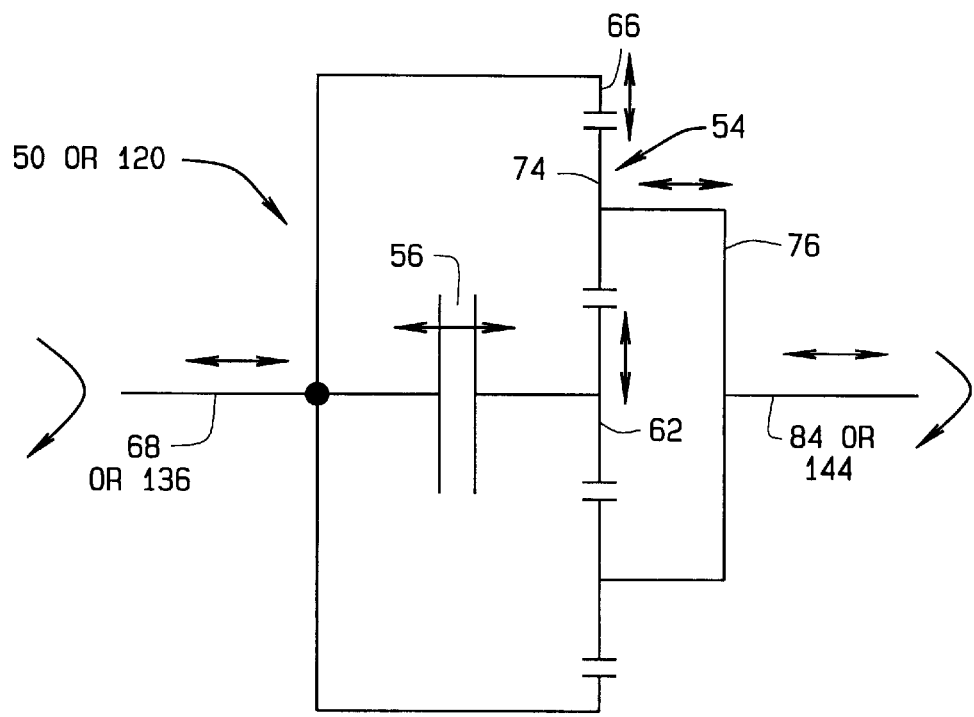
FIG. 7 is a is a kinematic diagram of the coupling for the two axle centers.

A modified axle center D (FIG. 6) likewise transfers torque from the drive shaft 16 to the axle shafts 18 which in turn deliver it to the wheels 4. However, the axle center D has two torque couplings 120 which are very similar to the coupling 50, but are coupled directly to the axle shafts 18 instead of to the pinion shaft 38. As a consequence, the torque delivered to each axle shaft 18 is controlled independently by its torque coupling 120, and that control is dependent solely on the current passing through the coil 94 in the electromagnet 90 of the coupling 120.

More specifically, the axle center D includes (FIG. 6) a main or center housing 122, which contains the pinion carrier 40 in which the pinion shaft 38 rotates. The pinion shaft 38 has a drive flange 124 engaged with it along mating splines and secured in place with a nut 126 that is turned down over the threads 44 on the shaft 38. The drive shaft 16 that extends from the transfer case or PTO 10 is coupled to the pinion shaft 38 at the drive flange 124. The pinion 36 rotates within the housing 122.

The housing 122 also contains a transfer shaft 130 which carries a ring gear 132 that meshes with the pinion 36, so that the drive shaft 16 rotates the transfer shaft 130 without any slippage between the two shafts 16 and 130. At its ends, the transfers shaft 130 has threads 134. Here the shaft 130 is fitted with input end flanges 136 which engage it through mating splines and are retained with nuts 138 which engage the threads 134. The input end flanges 136 on the shaft 130 rotate on antifriction bearings 140 that are fitted to the housing 122. The ring gear 132 lies at one side of the housing 122 and is coupled to the transfer shaft 130 at the end flange 136 at that side of the housing 122.

The torque couplings 120 are located at the sides of the housing 122 where torque from the transfer shaft 130 is transferred to them at the input end flanges 136. Actually each input end flange 136 forms part of the torque coupling 120 to which it transfers torque, it being the input torque member for the coupling 120. In addition each torque coupling 120 has a housing 142 which is attached to the main housing 122 and an output end flange 144 through which the coupling 120 is connected to the one of the axle shafts 18. Otherwise each torque coupling 120 is essentially the same as the torque coupling 50 of the axle center C. Indeed, the end flange 136 of each coupling 120 is basically the same as the end flange 68 of the coupling 50, whereas the end flange 144 of each coupling 120 is basically the same as the end flange 84 of the coupling 50. Thus, each coupling 120 has within its housing 142 a planetary set 54 and a magnetic particle clutch 56. To be sure, the planetary set 54 and the clutch 56 of each coupling 120 are reversed in position from their counterparts in the coupling 50 so that the torque is transferred to the coupling 120 at the end where its clutch 56 is located and delivered from the end where its planetary set 54 is located.

The axle center D may be used with an all-wheel-drive vehicle in which it will normally transmit torque to the secondary wheels 4. Or it may be used with a two wheel drive vehicle. In either type of vehicle, the two torque couplings 120 together function as a differential for the wheels 4, enabling one wheel 4 to rotate at a velocity different from the other wheel 4. Moreover, the torque couplings 120 distribute the torque between the two wheels 4, and the apportionment depends on the current in the coils 94 for the clutches 56 of the two couplings 120. When the current is equal, the coupling 120 transfer equal torque, even though one wheel 4 may rotate at a velocity different from the other wheel 4. On the other hand, the current in one coupling 120 may be elevated over the current in the other coupling 120 so that more torque is delivered to the wheel 4 driven through the higher current coupling 120. This enables the axle center D to compensate for oversteer and understeer.

Figure 8:
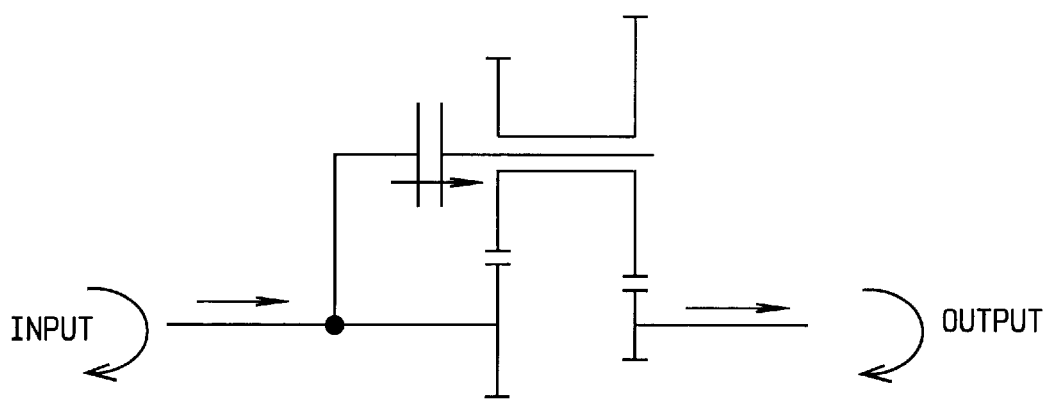
FIG. 8 is a kinematic diagram of a modified coupling.

Other hook ups are available between the planetary set 54 and the clutch 56 and indeed different planetary sets are suitable. One may have two planet gears and two sun gears, but no ring gear (FIG. 8). Generally speaking, it is preferred to have the torque in the clutch path pass through the low torque element of the planetary set 54. Also, the coupling 50 may be revised so that its end flange 68, with modification, becomes the torque input member and the end flange 84, again with modification, becomes the torque output member. The same reversal may be made with the couplings 120. Also, the brushes 96 and step rings 98 for the clutch 56 may be located at a lesser diameter to reduce wear.

| AXLE CENTER WITH ACTIVE TORQUE BIAS CONTROL | |
|---|---|
| A | automotive vehicle |
| C | axle center |
| D | modified axle center |
| 2 | front wheels |
| 4 | rear wheels |
| 6 | engine |
| 8 | transmission |
| 10 | transfercase |
| 12 | differential |
| 14 | axle shafts |
| 16 | drive shaft |
| 18 | axle shafts |
| 20 | housing |
| 22 | bearings |
| 24 | carrier |
| 26 | cross shaft |
| 28 | bevel gears |
| 30 | bevel gears |
| 32 | output shafts |
| 34 | ring gear |
| 36 | pinion |
| 38 | pinion shaft |
| 40 | pinion carrier |
| 42 | bearings |
| 44 | threads |
| 50 | torque bias coupling |
| 52 | housing |
| 54 | planetary set |
| 56 | clutch |
| 60 | |
| 62 | sun gear |
| 64 | stub shaft |
| 66 | ring gear |
| 68 | end flange |
| 70 | nut |
| 72 | machine screw |
| 74 | planet gears |
| 76 | carrier |
| 78 | spindles |
| 80 | stub shaft |
| 81 | bearing |
| 82 | threads |
| 84 | drive flange |
| 86 | nut |
| 90 | electromagnet |
| 92 | cylindrical surface |
| 94 | coil |
| 96 | brushes |
| 98 | slip rings |
| 100 | armature |
| 102 | sleeve |
| 104 | cylindrical surface |
| 106 | recesses |
| 108 | bearings |
| 110 | seals |
| 120 | torque coupling |
| 122 | housing |
| 124 | drive flange |
| 126 | nut |
| 130 | transfer shaft |
| 132 | ring gear |
| 134 | threads |
| 136 | end flanges |
| 138 | nuts |
| 140 | bearing |
| 142 | housing |
| 144 | end flange |

What is claimed is:

1. In an automotive vehicle having a road wheel on each side of the vehicle and an axle shaft extending to and coupled with each road wheel and also having a motor for producing torque to rotate the road wheels, an improved axle center located between the motor and axle shafts to enable torque produced by the motor to be transferred to the axle shafts and wheels, the axle center comprising: at least one torque coupling through which torque from the motor passes to at least one of the axle shafts, the coupling including an input torque member to which torque from the motor is delivered and an output torque member through which torque is delivered to at least one of the axle shafts, the coupling further including a planetary set and a magnetic particle clutch connected together such that a mechanical path and a clutch path exist through which torque is simultaneously transferred between the torque members, with essentially all of the torque that is delivered to the input torque member being transferred through the mechanical and clutch paths to the output torque member, the mechanical path bypassing the clutch and the clutch path including the clutch, the amount of torque transferred through the clutch path in relation to the mechanical path being variable by the clutch, but being less than the torque transmitted through the mechanical path.

2. The combination according to claim 1 wherein the clutch and planetary set are organized about a common axis.

3. The combination according to claim 2 wherein the clutch has first and second clutch members which are capable of rotating at different angular velocities and the clutch has the capability of transferring torque between the clutch members when the clutch members rotate at different angular velocities, the first clutch member being connected to one of the torque members; and wherein the planetary set includes first, second, third and fourth elements organized about the common axis, the first element being connected to the first clutch member and to said one of the torque members, the second element being connected to the second clutch member, the third element being connected to the other torque member, and the fourth element being connected between the first element and the second element and between the second element and the third element.

4. The combination according to claim 3 wherein the second element is a sun element which rotates about the axis; wherein the first element is a ring element located around the axis; wherein the fourth element is a planetary element located between and engaged with the sun and ring elements; and wherein the third element is a carrier element which rotates about the axis and on which the planetary elements rotate.

5. The combination according to claim 1 wherein the axle center further includes a pinion connected to the output member of the torque coupling; a ring gear engaged with the pinion, a differential carrier attached to and rotatable with the ring gear, a cross shaft carried by the differential carrier and oriented generally perpendicular to the axis of the ring gear, first bevel gears on the cross shaft, and second bevel gears engaged with the first bevel gears and connected to the axle shafts.

6. The combination according to claim 1 wherein the axle center has two torque couplings; and wherein the output members of the torque couplings are connected to the axle shafts.

7. The combination according to claim 6 wherein the axle center further includes a pinion to which the motor delivers torque, a transfer shaft extended between the input members of the two torque couplings, and a ring gear located around and attached to the transfer shaft, with the ring gear being engaged with the pinion.

8. An axle center comprising: a pinion rotatable about a first axis, a differential cluster including a ring gear rotatable about a second axis that is at an angle with respect to the first axis, and a torque coupling comprising: an input torque member adapted to be connected to a source of torque; an output torque member connected to the pinion; a magnetic particle clutch having first and second clutch members which rotate about a first axis, the clutch being capable of transferring torque between the clutch members when the clutch members rotate at different angular velocities, the first clutch member being connected to one of the torque members; and a planetary gear set organized about the first axis and including first, second, third and fourth elements, the first element being connected to the first clutch member and to said one of the torque members, the second element being connected to the second clutch member such that all of the torque transferred through the clutch passes through the second element, the third element being connected to the other torque member, and the fourth element being connected between the first element and the second element and between the second element and the third element, whereby torque transfers through the coupling in a mechanical path which bypasses the clutch and in a clutch path which includes the clutch, the configuration of the planetary set being such that most of the torque passes through the mechanical path.

9. An axle center according to claim 8 wherein the second element of the planetary set for the torque coupling is a sun element which rotates about the first axis; wherein the first element is a ring element located around the first axis, wherein the fourth element is a planetary element located between and engaged with the sun and ring elements; and wherein the third element is a carrier element which rotates about the first axis and on which the planetary elements rotate.

10. An axle center according to claim 8 wherein the pinion and differential cluster are enclosed in a housing and the planetary set and the clutch are enclosed in a housing that is joined to the housing of that encloses the pinion and differential cluster.

11. An axle center comprising: a pinion adapted to be connected to a source of torque and rotatable about a first axis; a transfer shaft rotatable about a second axis that is located at an angle with respect to the first axis; a ring gear carried by the transfer shaft and engaged with the pinion; and a torque coupling at each end of the transfer shaft, each torque coupling including: an input torque member connected to the transfer shaft; an output torque member from which torque is delivered; a magnetic particle clutch having first and second clutch members which rotate about the second axis, the clutch being capable of transferring torque between the clutch members when the clutch members rotate at different angular velocities, the first clutch member being connected to one of the torque members; and a planetary gear set organized about the second axis and including first, second, third and fourth elements, the first element being connected to the first clutch member and to said one of the torque members, the second element being connected to the second clutch member such that all of the torque transferred through the clutch passes through the second element, the third element being connected to the other torque member, and the fourth element being connected between the first element and the second element and between the second element and the third element, whereby torque transfers through each coupling in a mechanical path which bypasses the clutch and in a clutch path which includes the clutch, the planetary set being configured such that most of the torque transferred by the coupling passes through the mechanical path.

12. An axle center according to claim 11 wherein the second element of the planetary set in the torque coupling is a sun element which rotates about the axis; wherein the first element is a ring element located around the axis; wherein the fourth element is a planetary element located between and engaged with the sun and ring elements; and wherein the third element is a carrier element which rotates about the axis and on which the planetary elements rotate.

13. An axle center according to claim 11 wherein the pinion, the transfer shaft and ring gear are enclosed in a housing; wherein each torque coupling includes a housing that encloses its clutch and planet set and is joined to the housing that encloses the pinion, transfer shaft, and ring gear.

\* \* \* \* \*